R. Montgomery,
File for Beams.
No. 108,165.      Patented Oct. 11. 1870.
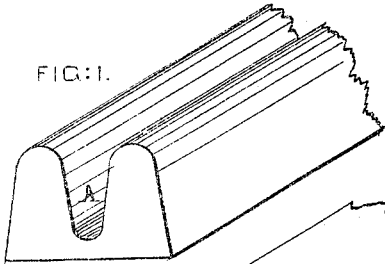
FIG:1.
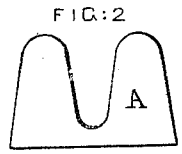
FIG:2.
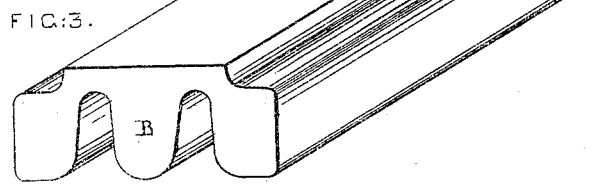
FIG:3.
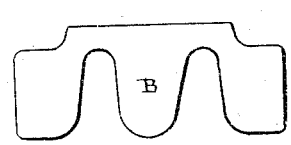
FIG:4.
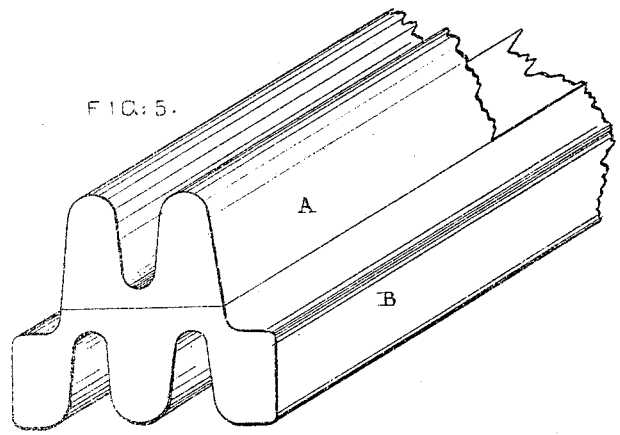
FIG:5.
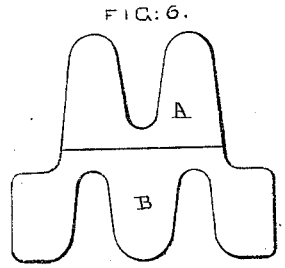
FIG:6.
Witnesses
H. H. Young
Joseph Bartz
Richard Montgomery,
By David A. Burr
Atty:

UNITED STATES PATENT OFFICE.

RICHARD MONTGOMERY, OF NEW YORK, N. Y.

IMPROVEMENT IN PILES FOR CORRUGATED BEAMS.

Specification forming part of Letters Patent No. 108,165, dated October 11, 1870.

I, RICHARD MONTGOMERY, of the city, county, and State of New York, have invented an Improvement in the Manufacture of Longitudinally Corrugated or Grooved Wrought-Iron Beams, of which the following is a specification:

My invention relates to the combination of bars of a peculiar form in the formation of a "pile" for the production of a longitudinally-corrugated beam of iron; the object of my invention being to dispense with the preliminary steps heretofore adopted in the manufacture of these beams, and consequently to reduce its cost.

In the accompanying drawings, Figure 1 is a view in perspective, and Fig. 2 an end view, of one of the bars which I employ in the formation of my improved pile. Figs. 3 and 4 are corresponding views of the second bar completing the same; and Figs. 5 and 6 are corresponding views of the complete pile, ready to be passed, at a welding heat, between the finishing-rolls.

Heretofore, in the manufacture of longitudinally-corrugated beams or rails of wrought-iron, a pile has first been formed of ordinary flat bars, which, being properly heated and passed between a series of roughing and shaping rolls—usually two or three in number—is gradually reduced to a form approximating that of the finished beam, and illustrated in Fig. 5 of the drawing. At this stage of the process the metal generally requires reheating.

In my present invention I avoid all these laborious and expensive preliminary steps in the manufacture of the beam, and attain the same end by forming a pile having the same shape as the bar thereby produced, from which, with the same rolls and the same number of passes, I manufacture as perfect a beam as can be produced from said bar.

The pile, Fig. 5, is formed of two bars, A, Figs. 1 and 2, and B, Figs. 3 and 4, which are rolled out directly from the bloom with no more labor or expense than is required in rolling out the bars used in forming the pile in the old process. To produce these bars A and B, the roughing-rolls, by which the blooms are shaped into the flat extended bars of commerce, are grooved so as to form bars longitudinally channeled on one side and flattened on the other, and otherwise outwardly shaped, as illustrated in Figs. 1 to 4 of the drawing, so as to correspond with the one or the other half or division of a longitudinally-divided bar of the form produced in the old process from a pile of flat bars by the roughing and shaping rolls, which I dispense with.

My improved pile, formed of the bars A and B brought together in pairs and superimposed, as shown in Figs. 5 and 6, is heated to a welding temperature, and then completed into a perfect beam by passing it between suitable rolls, in the usual manner, without the necessity of reheating.

It is manifest that a beam may be thus produced, irrespective of the number of longitudinal folds or channels therein, by imparting a proper shape to the two bars A B, which are to constitute the pile from which it is to be rolled, and that the shape of the bars A and B may be varied at pleasure by varying the shape of the roughing-rolls employed in reducing the blooms.

It is also evident that the longitudinal division of the pile, Fig. 5, might be made vertical instead of horizontal, as therein illustrated, in which case the two divisions might each be produced by the same rolls.

It would, however, be difficult to obtain a perfect weld and union of the bars in passing this form of pile, in the ordinary manner, through the finishing-rolls.

Instead of forming the pile of two bars or longitudinal divisions, A B, as described, I contemplate the possibility of building it up of three or more bars, each fashioned so as to correspond to a definite longitudinal division of a bar, having substantially the form shown in Figs. 5 and 6, so that when brought together they will form a pile of that shape.

I claim as my invention—

A wrought-iron pile for beams, composed of two or more bars grooved longitudinally, and of such shape that when put together they constitute a pile of the configuration herein described.

R. MONTGOMERY.

Witnesses:
    M. J. MONTGOMERY,
    DAVID A. BURR.